United States Patent [19]
Gordon

[11] Patent Number: 5,630,696
[45] Date of Patent: May 20, 1997

[54] APPARATUS FOR POSITIONING AN OBJECT

[75] Inventor: Donald J. Gordon, Rockwood, Canada

[73] Assignee: Tampa Hall Limited, Ayr, Canada

[21] Appl. No.: 606,707

[22] Filed: Feb. 26, 1996

[51] Int. Cl.⁶ ........................................... B65G 7/00
[52] U.S. Cl. ................... 414/782; 414/11; 414/778
[58] Field of Search ............... 414/11, 768, 769, 414/770, 777, 778, 780, 782

[56] References Cited

U.S. PATENT DOCUMENTS

| | | |
|---|---|---|
| 1,286,504 | 12/1918 | Beckman ..................... 414/782 X |
| 2,859,884 | 11/1958 | Pearce ......................... 414/11 X |
| 3,552,538 | 1/1971 | Triggs et al. . |
| 3,883,007 | 5/1975 | Hirschboeck ..................... 414/782 |
| 4,175,655 | 11/1979 | Baldwin . |
| 4,220,239 | 9/1980 | Prichard, Jr. . |
| 4,793,463 | 12/1988 | Kane . |
| 4,890,717 | 1/1990 | Kane . |
| 5,322,404 | 6/1994 | Keller . |

FOREIGN PATENT DOCUMENTS

| | | |
|---|---|---|
| 237996 | 2/1924 | Canada . |
| 504755 | 8/1954 | Canada . |
| 615542 | 2/1961 | Canada . |
| 833372 | 2/1970 | Canada . |

Primary Examiner—Karen B. Merritt
Assistant Examiner—Janice L. Krizek
Attorney, Agent, or Firm—Jeffrey T. Imai; Arne I. Fors; D. Doak Horne

[57] ABSTRACT

Apparatus for positioning an object includes a fixed vertical frame and a carriage to support the object. The carriage includes a first end with rollers to engage the frame and a second end with a bearing to engage a floor or other surface. Also at the second end is a gate which can be moved from a position wherein it is parallel to said carriage to a position wherein it is perpendicular to said carriage. A drive operates a cable linkage to move the first end of the carriage along the frame and to rotate driven wheels in the bearing to move the carriage between vertical and horizontal positions.

14 Claims, 4 Drawing Sheets

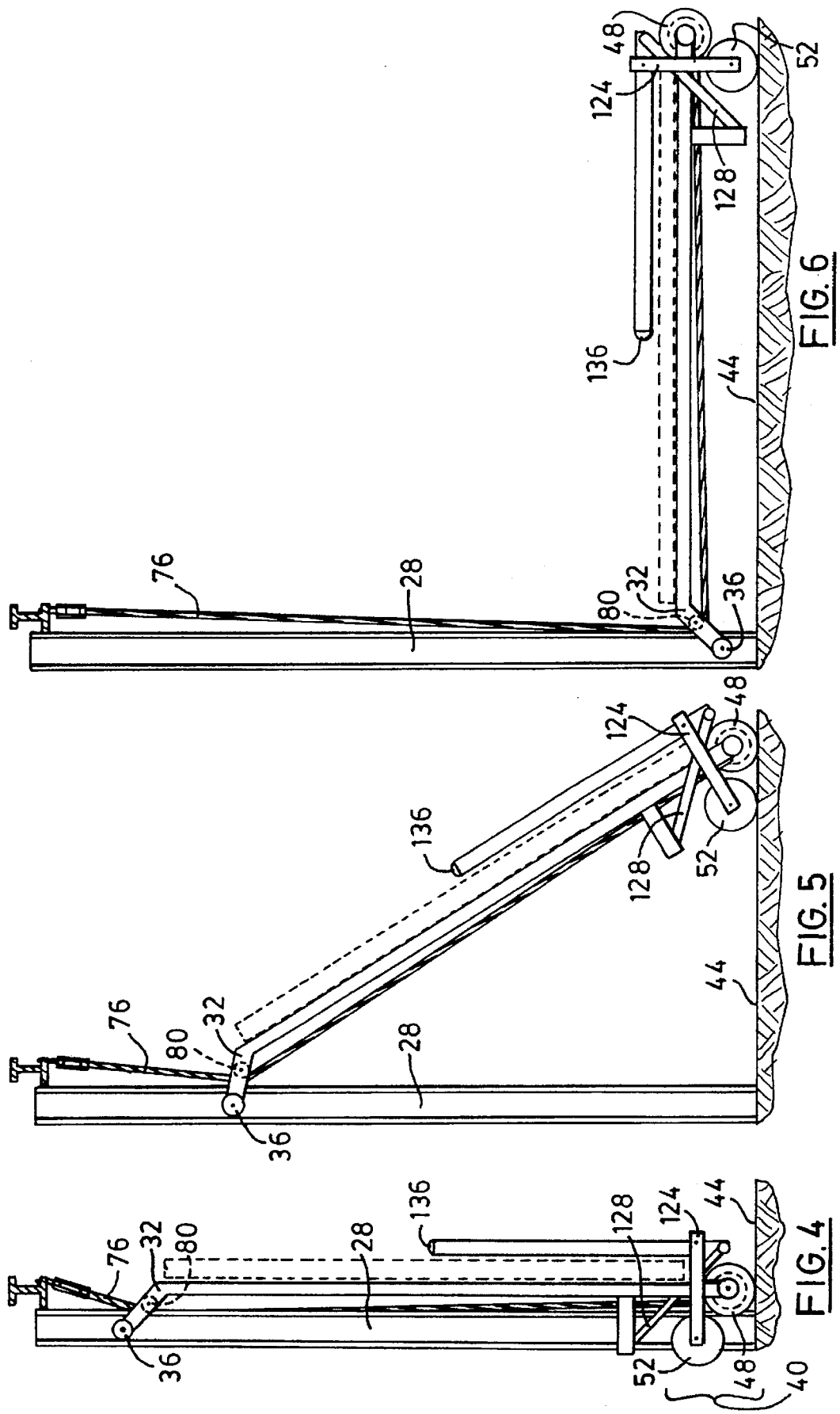

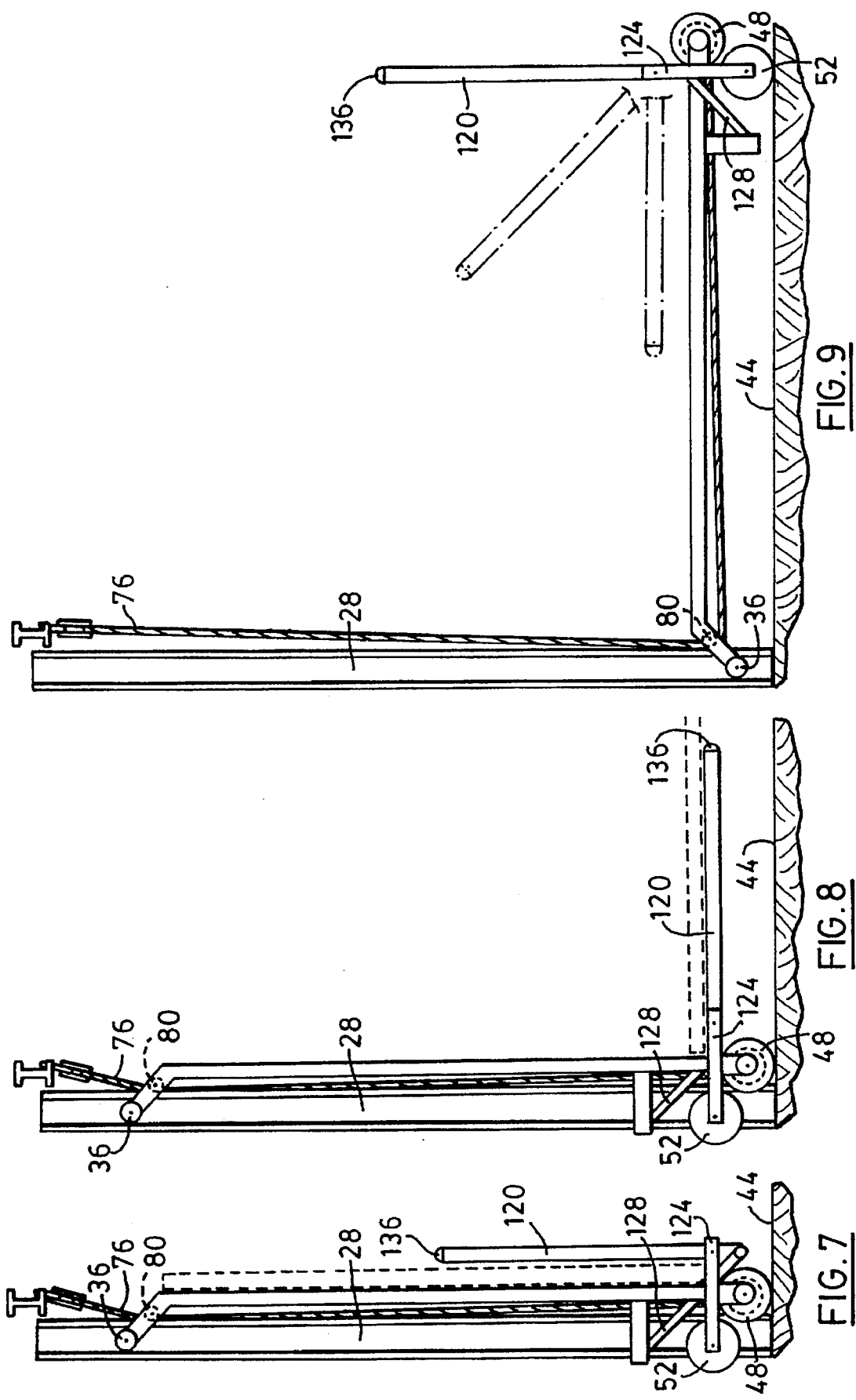

APPARATUS FOR POSITIONING AN OBJECT

FIELD OF THE INVENTION

The present invention relates to an apparatus for manipulating the position of objects. More specifically, the present invention relates to an apparatus which is operable to position an object received in a first orientation into a first horizontal position, with one side facing up, and to then invert the article so that a second, opposite, side faces up.

BACKGROUND OF THE INVENTION

Devices to invert objects are known and are used in many industries. For example, Pritchard U.S. Pat. No. 4,220,239 teaches a device for inverting sheets of gypsum board during their manufacturing process. A set of lifting arms engage the lower surface of a sheet of green gypsum board and rotate it about one edge to a vertical position wherein a set of catcher arms engage the other surface of the gypsum board. The catcher arms then continue rotation of the gypsum board to place it onto an adjacent conveyor belt with the surface which was previously underneath now being on top.

Trigg et al. U.S. Pat. No. 3,552,538 shows another device for inverting flat articles such as sheets of drywall, etc. The device comprises a pair of lifting arms and a pair of rear arms which are arranged along a conveyor. The leading edge of a flat article travelling along the conveyor is lifted by the lifting arms with the trailing edge of the article resting on the rear arms. The leading edge of the article is rotated through a vertical position until the article abuts a rearwardly inclined surface, at which point the trailing edge of the article engages the lifting arms which lower the trailing edge to engage the conveyor, thereby returning the article to a horizontal, inverted position on the conveyor.

However, problems exist with the prior art devices for inverting planar objects of which the present inventor is aware. Specifically, the prior art devices are only operable to invert the position of an article and cannot re-invert the article if such should be desirable or required. Further, the prior art devices invert the article by moving the article from one side of the device to the other side and thus require a clear area about the device of at least twice the size of the article.

It is therefore desirable to have an apparatus which is operable to position a substantially planar object in a horizontal position wherein either side is facing up, as desired, and to reposition the article so that the other side faces up.

SUMMARY OF THE INVENTION

It is an object of the present invention to provide a novel apparatus for positioning objects which obviates or mitigates at least one of the disadvantages of the prior art.

According to a first aspect of the present invention, there is provided an apparatus for moving an object from a substantially vertical position to a substantially horizontal position such that a first side of the object is facing up and for then repositioning the object to a substantially horizontal position wherein a second, opposite, side of said object is facing up, the device comprising:

at least one elongate member fixed in a substantially vertical position;

a carriage having at least one carriage surface to contact said object, a first end of said carriage engaging said at least one elongate member in a manner such that said first end is moveable along said fixed member and a second carriage end having a bearing means moveable along a substantially horizontal surface;

carriage drive means to move said carriage between a first position wherein said carriage is substantially vertical and a second position wherein said carriage is substantially horizontal;

a gate located adjacent said second end of said carriage and being pivotally connected to said carriage and including at least one gate surface to contact said object; and gate drive means to move said gate between a first gate position wherein said gate is positioned such that said at least one gate surface is opposed to and spaced from said at least one carriage surface defining an object receiving volume therebetween and a second gate position wherein said at least one gate surface is substantially perpendicular to said at least one carriage surface.

Preferably, the object is substantially planar. Also preferably, the carriage drive means comprises a cable drive which acts against said elongate member. Also preferably, the bearing means comprises a driven set of wheels. Also preferably, the bearing means further includes a set of idler wheels and said driven wheels are driven by said cable drive. Also preferably, said gate drive means comprises at least one hydraulic ram.

According to another aspect of the present invention, there is provided an apparatus for positioning an object from a substantially vertical position to a substantially horizontal position such that a first side of the object is facing up, said device being operable to reposition the object such that a second, opposite, side of said object is facing up, the device comprising:

at least one track element fixed in a substantially vertical position;

a carriage having at least one carriage surface to contact said object, a roller located adjacent a first end of said carriage and engaging said track element in a manner such that said roller is moveable substantially vertically along said track element and a bearing means located adjacent a second end of said carriage, said bearing means being moveable along a support surface, said support surface being substantially horizontal;

carriage drive means to move said carriage between a first carriage position wherein said roller is distal said support surface and a second carriage position wherein said roller is adjacent said support surface;

a gate located adjacent said second end of said carriage and being pivotally connected thereto and including at least one gate surface to contact said object; and gate drive means to move said gate between a first gate position wherein said gate is positioned such that said at least one gate surface is opposed to and spaced from said at least one carriage surface and a second gate position wherein said at least one gate surface is substantially perpendicular to said at least one carriage surface.

BRIEF DESCRIPTION OF THE DRAWINGS

A preferred embodiment of the present invention will now be described, by way of example only, with reference to the attached Figures, wherein:

FIG. 4 is a side view of the apparatus of FIG. 1 in the direction indicated in FIG. 1;

FIG. 5 is a side view of the apparatus of FIG. 1 showing a carriage in an intermediate position;

FIG. 6 is a side view of the apparatus of FIG. 1 showing the carriage in a horizontal position;

FIG. 7 is a side view of the apparatus of FIG. 1 showing the carriage returned to a vertical position;

FIG. 8 is a side view of the apparatus of FIG. 1 showing a gate in a horizontal position; and FIG. 9 is a side view of the apparatus of FIG. 1 showing the range of movement of the gate.

DETAILED DESCRIPTION OF THE INVENTION

Figure 1:
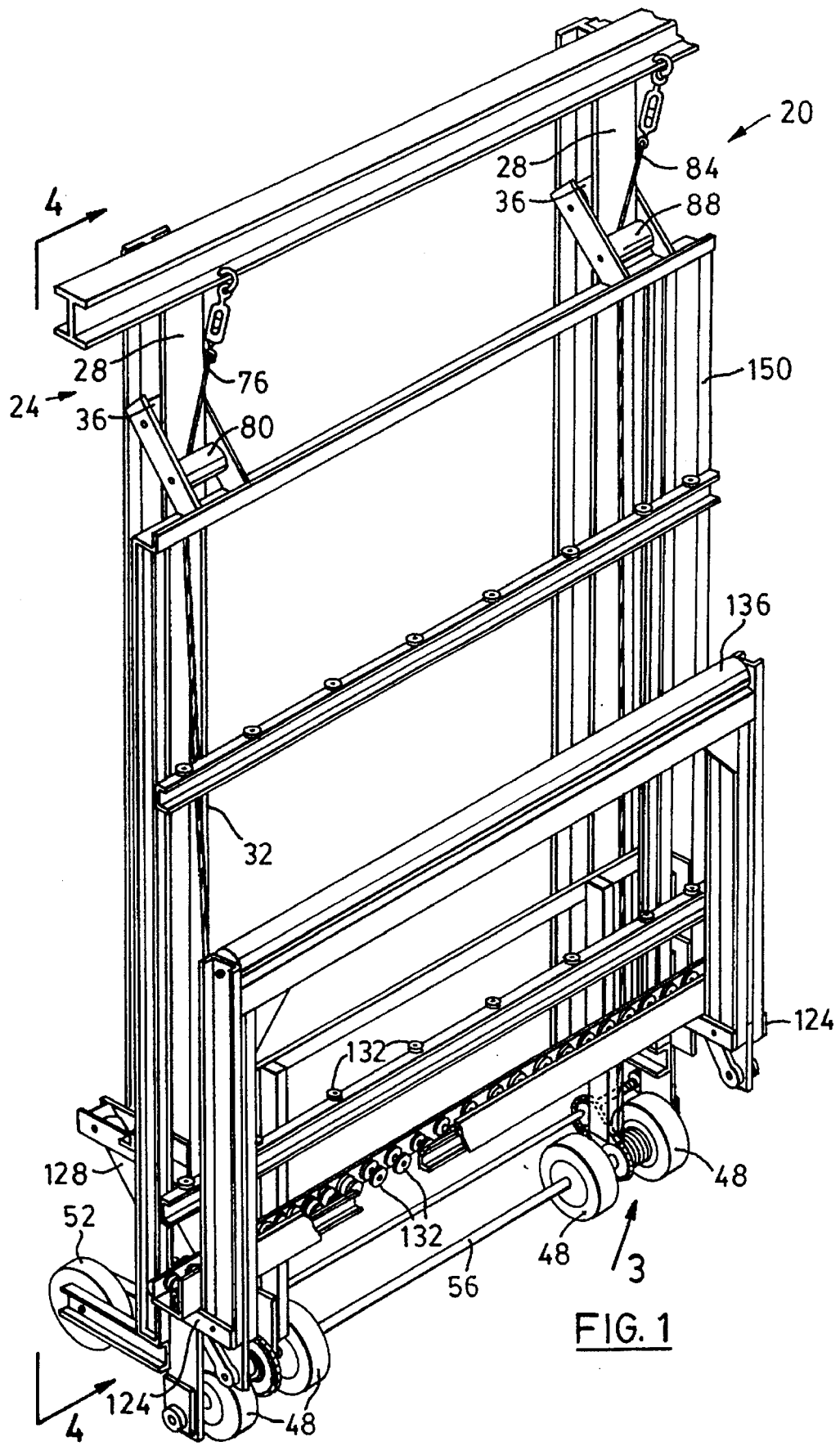
FIG. 1 is a front perspective view of an embodiment of the present invention in a vertical position.

An apparatus in accordance with the present invention is indicated generally at 20 in FIG. 1. Apparatus 20 comprises a frame 24 which is fixed in position and which comprises a pair of elongate members 28. A carriage 32 includes a first end with two roller assemblies 36, each of which movably engages a respective one of elongate members 28, and a second end with two bearing assemblies 40 which rest on a floor 44.

Figure 3:
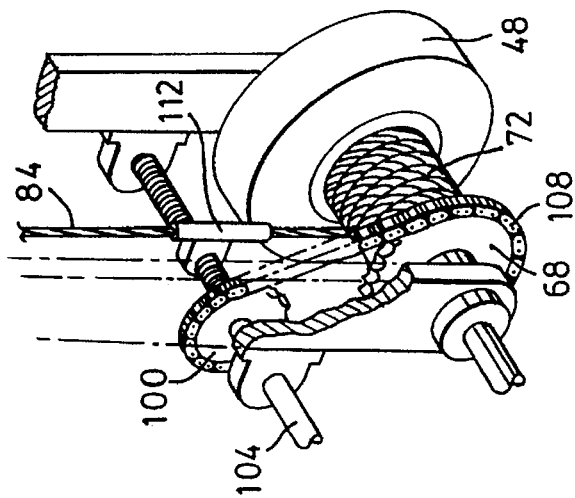
FIG. 3 is a partially cut away view of the windlass of the apparatus of FIG. 1 in the direction indicated in FIG. 1.
Figure 2:
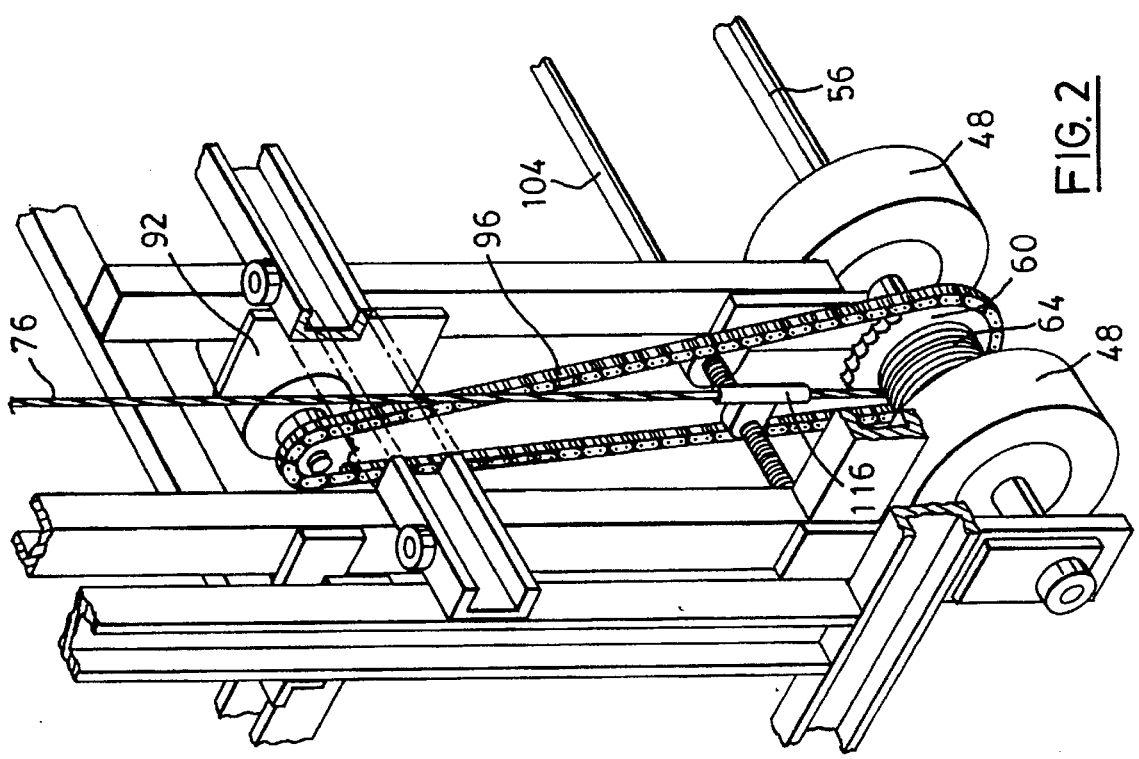
FIG. 2 is a partially cut away view of the drive means of the apparatus of FIG. 1 in the direction indicated in FIG. 1.

Each bearing assembly 40 comprises a pair of driven wheels 48, best seen in FIGS. 2 and 3, and an idler wheel 52. Driven wheels 48 in each bearing means 40 are connected to the driven wheels 48 in the other bearing means 40 by a shaft 56 such that rotation of one driven wheel 48 results in corresponding rotation of the other driven wheels 48. Attached to one end of shaft 56 is a drive sprocket 60 and a cable drum 64 and attached to the other end of shaft 56 is a similar drive sprocket 68 and cable drum 72. A cable 76 is anchored at the top of frame 24 and runs under a cable roller 80 to cable drum 64. A similar cable 84 is also anchored at the top of frame 24 and runs under a similar cable roller 88 to cable drum 72.

Drive sprocket 60 is connected to a hydraulic motor 92 by an appropriate chain 96 such that, as motor 92 rotates, drive sprocket 60 rotates to rotate wheels 48 and shaft 56. As shaft 56 rotates, sprocket 68 is rotated and rotates a sprocket 100 mounted to a shaft 104 via a chain drive 108. As shaft 104 is rotated, a pair of windlasses 112, 116 move along threaded portions of shaft 104 to assist in winding of cables 84 and 76 on cable drums 72 and 64 respectively.

A gate 120 is pivotally connected to one end of each of a pair of base members 124 located at each side of carriage 32 distal the roller assemblies 36. Idler wheels 52 are rotatably attached to the other the ends of base members 124.

A hydraulic ram 128 extends between carriage 32 and gate 120 such that when ram 128 is extended, gate 120 is positioned substantially parallel to carriage 32, as shown for example in FIGS. 1, 4 and 5. When hydraulic ram 128 is retracted, gate 120 is rotated to a position wherein it is substantially perpendicular to carriage 32, as shown in FIG. 8. Carriage 32 includes a plurality of rollers 132 to assist in receiving an object, such an object being indicated in ghost line in FIG. 4, between carriage 32 and gate 120. Gate 120 further includes a roller 136 to assist in removing an object when gate 120 is in the position shown in FIG. 8.

Operation of the presently preferred embodiment of the present invention will now be described, with reference to FIGS. 4 through 8. FIG. 4 shows apparatus 20 in an initial position wherein a vertical object, shown in ghosted line, is placed into the space defined between carriage 32 and gate 120 using rollers 132. As motor 92 rotates in one direction, cables 76 and 84 are unwound from cable drums 64 and 72 respectively and driven wheels 48 rotate to move the bottom of carriage 32 away from frame 24. As cables 76 and 84 are unwound, windlasses 116 and 112 move to ensure free movement of the respective cables and roller assemblies 36 move down elongate members 28 until carriage 32 reaches the position shown FIG. 5.

At this point, idler wheels 52 engage floor 44, disengaging driven wheels 48 from floor 44, and roller assemblies 36 continue to move down elongate members 28 as the bottom of carriage 32 moves away from frame 24 until carriage 32 reaches the position shown in FIG. 6. At this point, processing operations may be performed on the object resting on carriage 32 as required. If gate 120 interferes with the performance of such processing operations, hydraulic ram 128 may be retracted to move gate 120 to a vertical position as shown in FIG. 9.

When the processing operations are completed on the upper surface of the object, gate 120 is moved back to a position wherein it is parallel to carriage 32, if it was moved from this position, and motor 92 is rotated in the opposite direction to wind cables 76 and 84 onto cable drums 64 and 72, moving carriage 32 back to the position shown in FIG. 5. At this point driven wheels 48 re-engage floor 44 and co-operate with cables 76 and 84 to return carriage to the position shown in FIG. 7.

Next, hydraulic ram 128 is retracted and gate 120 is lowered to the position shown in FIG. 8, along with the object resting on it. At this point, processing operations may be performed on the upper surface of the object, which is the surface opposite to that which was the upper surface when apparatus 20 was in the position shown in FIG. 6. When the processing, if any, is completed, the object may be removed from gate 120 with the assistance of roller 136 and hydraulic ram 128 extended again to return gate 120 to the condition shown in FIG. 1. At this point another object may be received in apparatus 20 and the process repeated.

The present invention has been found to be particularly useful for positioning large planar objects, such as prefabricated wall assemblies for buildings. In particular, wall sections with a height of eight feet or more and a width of six feet or more have been conveniently positioned with the preferred embodiment of the present invention.

It will be apparent to those of skill in the art that it is not required that two cables be employed to move carriage 32 between vertical and horizontal positions and a single cable could be used. However, two cables have been employed in the preferred embodiment of the present invention to accommodate the dead weight of the particular object (a prefabricated wall assembly) and to mitigate twisting of carriage 32.

It will also be understood by those of skill in the art that apparatus 20 may be relatively easily modified to accommodate wider objects. Specifically, carriage 32 may be widened by adding one or more additional elongate members 150 and corresponding sets of bearing means 40 and gate 120 widened accordingly.

The above-described embodiments of the invention are intended to be examples of the present invention and alterations and modifications may be effected thereto, by those of skill in the art, without departing from the scope of the invention which is defined solely by the claims appended hereto.

I claim:

1. Apparatus for moving an object from a substantially vertical position to a substantially horizontal position such that a first side of the object is facing up and for then repositioning the object to a substantially horizontal position wherein a second, opposite, side of said object is facing up, the device comprising:

at least one elongate member fixed in a substantially vertical position;

a carriage having at least one carriage surface to contact said object, a first end of said carriage engaging said at least one elongate member in a manner such that said first end is moveable along said fixed member and a second carriage end having a bearing means moveable along a substantially horizontal surface;

carriage drive means to move said carriage between a first position wherein said carriage is substantially vertical and a second position wherein said carriage is substantially horizontal, said carriage drive means comprises at least one cable having one end of said at least one cable anchored to said elongate member and an opposite end of said at least one cable is anchored to a driven drum rotatably mounted to said carriage;

a gate located adjacent said second end of said carriage and being pivotally connected to said carriage and including at least one gate surface to contact said object; and gate drive means to move said gate between a first gate position wherein said gate is positioned such that said at least one gate surface is opposed to and spaced from said at least one carriage surface defining an object receiving volume therebetween and a second gate position wherein said at least one gate surface is substantially perpendicular to said at least one carriage surface.

2. Apparatus according to claim 1 wherein said carriage further comprises a plurality of rollers to assist in receiving an object in said receiving volume.

3. Apparatus as defined in claim 1 wherein said bearing means comprises at least a pair of driven wheels and a pair of idler wheels.

4. Apparatus according to claim 3 wherein said driven wheels are driven by said cable drum and said idler wheels support said second carriage end when in said second position.

5. Apparatus according to claim 4 wherein said gate drive means comprises a hydraulic ram.

6. An apparatus for positioning an object from a substantially vertical position to a substantially horizontal position such that a first side of the object is facing up, said device being operable to reposition the object such that a second, opposite, side of said object is facing up, the device comprising:

at least one track element fixed in a substantially vertical position;

a carriage having at least one carriage surface to contact said object, a roller assembly located adjacent a first end of said carriage and engaging said track element in a manner such that said roller assembly is moveable substantially vertically along said track element and a bearing means located adjacent a second end of said carriage, said bearing means being moveable along a support surface, said support surface being substantially horizontal;

carriage drive means to move said carriage between a first carriage position wherein said roller assembly is distal said support surface and a second carriage position wherein said roller assembly is adjacent said support surface;

a gate located adjacent said second end of said carriage and being pivotally connected thereto and including at least one gate surface to contact said object; and gate drive means to move said gate between a first gate position wherein said gate is positioned such that said at least one gate surface is opposed to and spaced from said at least one carriage surface and a second gate position wherein said at least one gate surface is substantially perpendicular to said at least one carriage surface.

7. Apparatus as defined in claim 6 including two track elements.

8. Apparatus according to claim 6 wherein said bearing means comprises at least one pair of driven wheels and one pair of idler wheels.

9. Apparatus as defined in claim 6 wherein said carriage drive means comprises at least one cable fixed relative to said carriage and a driven cable drum on said carriage.

10. Apparatus as defined in claim 9 wherein said driven cable drum is driven by a hydraulic motor.

11. Apparatus as defined in claim 9 wherein said gate drive means comprises a hydraulic ram.

12. Apparatus according to claim 9 wherein said bearing means comprises at least one pair of driven wheels and one pair of idler wheels.

13. Apparatus according to claim 12 wherein said driven wheels and said driven cable drum are driven by a hydraulic motor.

14. Apparatus according to claim 13 wherein said gate and said carriage each has a plurality of rollers to assist in receiving an object thereover.

* * * * *